United States Patent
Hefner, Jr. et al.

(10) Patent No.: US 10,239,990 B2
(45) Date of Patent: Mar. 26, 2019

(54) ISATIN COPOLYMERS HAVING INTRINSIC MICROPOROSITY

(71) Applicant: Dow Global Technologies LLC, Midland, MI (US)

(72) Inventors: Robert E. Hefner, Jr., Rosharon, TX (US); Brian L. Cramm, Lake Jackson, TX (US)

(73) Assignee: DOW GLOBAL TECHNOLOGIES LLC

( * ) Notice: Subject to any disclaimer, the term of this patent is extended or adjusted under 35 U.S.C. 154(b) by 16 days.

(21) Appl. No.: 15/558,449

(22) PCT Filed: May 16, 2016

(86) PCT No.: PCT/US2016/032624
§ 371 (c)(1),
(2) Date: Sep. 14, 2017

(87) PCT Pub. No.: WO2016/195977
PCT Pub. Date: Dec. 8, 2016

(65) Prior Publication Data
US 2018/0066103 A1    Mar. 8, 2018

Related U.S. Application Data

(60) Provisional application No. 62/167,958, filed on May 29, 2015.

(51) Int. Cl.
| | |
|---|---|
| *C08G 8/02* | (2006.01) |
| *C08J 5/22* | (2006.01) |
| *B01D 67/00* | (2006.01) |
| *B01D 71/62* | (2006.01) |
| *B01D 71/76* | (2006.01) |
| *C08G 16/00* | (2006.01) |
| *C08G 61/12* | (2006.01) |
| *C08G 73/06* | (2006.01) |

(52) U.S. Cl.
CPC ....... *C08G 61/124* (2013.01); *B01D 67/0006* (2013.01); *B01D 71/62* (2013.01); *B01D 71/76* (2013.01); *C08G 8/02* (2013.01); *C08G 16/00* (2013.01); *C08G 61/12* (2013.01); *C08G 73/0672* (2013.01); *C08J 5/2256* (2013.01); *C08G 2261/124* (2013.01); *C08G 2261/1412* (2013.01); *C08G 2261/1422* (2013.01); *C08G 2261/1424* (2013.01); *C08G 2261/1426* (2013.01); *C08G 2261/1428* (2013.01); *C08G 2261/344* (2013.01); *C08G 2261/516* (2013.01); *C08G 2340/00* (2013.01); *C08J 2365/00* (2013.01)

(58) Field of Classification Search
CPC ........ C08G 61/124; C08G 8/02; C08G 16/00; C08G 61/12; C08G 73/0672; C08G 2261/124; C08G 2261/1412; C08G 2261/1422; C08G 2261/1426; C08G 2261/1428; C08G 2261/516; B01D 67/0006; B01D 71/62; B01D 71/76; C08J 5/2256
See application file for complete search history.

(56) References Cited

U.S. PATENT DOCUMENTS

| | | |
|---|---|---|
| 5,629,084 A | 5/1997 | Moya |
| 7,410,525 B1 | 8/2008 | Liu et al. |

(Continued)

FOREIGN PATENT DOCUMENTS

| | | |
|---|---|---|
| KR | 20150027605 | 3/2015 |
| WO | 2005113121 | 12/2005 |

(Continued)

OTHER PUBLICATIONS

Grogojo et al., Adv. Funct. Mater. 2014, 24, 4729-4737.
(Continued)

*Primary Examiner* — Shane Fang

(57) ABSTRACT

A copolymer including a repeating unit represented by Formula I: wherein: L is a divalent hydrocarbon group comprising from 1 to 12 carbon atoms; and L' is optional and when present is represented by Formula II: wherein: Y, Y' and Y" if present, are independently selected from: a carboxylic acid, sulfonic acid, phosphorous acid and phosphoric acid and their corresponding salt or ester; imino, amide, nitrile, hydrogen, hydroxyl and alkyl comprising from 1 to 6 carbon atoms; and A, A' and A" if present, are independently selected from an arylene moiety, with the proviso one or both Y" and A" may not be present.

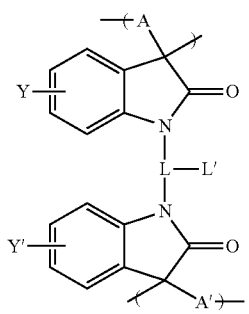

I

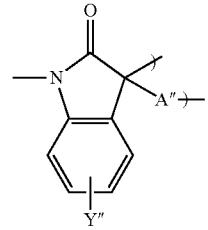

II

10 Claims, No Drawings

(56) References Cited

U.S. PATENT DOCUMENTS

| | | |
|---|---|---|
| 7,485,173 B1 | 2/2009 | Liu et al. |
| 7,690,514 B2 | 4/2010 | McKeown et al. |
| 7,758,751 B1 | 7/2010 | Liu et al. |
| 7,771,857 B2 | 8/2010 | Fritsch et al. |
| 7,806,962 B2 | 10/2010 | Liu et al. |
| 7,943,543 B1 | 5/2011 | Liu et al. |
| 8,048,198 B2 | 11/2011 | Liu et al. |
| 8,056,732 B2 | 11/2011 | McKeown et al. |
| 8,132,677 B2 | 3/2012 | Liu et al. |
| 8,575,414 B2 | 11/2013 | Liu et al. |
| 8,613,362 B2 | 12/2013 | Liu et al. |
| 8,623,928 B2 | 1/2014 | Du et al. |
| 8,686,104 B2 | 4/2014 | Du et al. |
| 8,809,488 B2 | 8/2014 | Du et al. |
| 8,814,982 B2 | 8/2014 | Liu et al. |
| 8,894,859 B2 | 11/2014 | Livingston et al. |
| 8,969,628 B2 | 3/2015 | Priske et al. |
| 9,018,270 B2 | 4/2015 | McKeown et al. |
| 9,126,185 B2 | 9/2015 | Laskoski |
| 9,238,202 B2 | 1/2016 | Liskey et al. |
| 2004/0198587 A1 | 10/2004 | McKeown et al. |
| 2006/0246273 A1 | 11/2006 | McKeown et al. |
| 2007/0209505 A1 | 9/2007 | Liu et al. |
| 2009/0031897 A1 | 2/2009 | Liu et al. |
| 2009/0120875 A1 | 5/2009 | Liu et al. |
| 2009/0155464 A1 | 6/2009 | Liu et al. |
| 2010/0130634 A1 | 5/2010 | Fritsch |
| 2012/0157743 A1 | 6/2012 | Liu et al. |
| 2012/0273421 A1 | 11/2012 | Perry et al. |
| 2013/0085191 A1 | 4/2013 | Laskoski |
| 2013/0112619 A1 | 5/2013 | Livingston et al. |
| 2013/0146538 A1 | 6/2013 | Liu et al. |
| 2013/0172433 A1 | 7/2013 | McKeown et al. |
| 2013/0217799 A1 | 8/2013 | Visser et al. |
| 2013/0220415 A1* | 8/2013 | Zhou ............ H01L 31/0256 136/256 |
| 2013/0247756 A1 | 9/2013 | Li et al. |
| 2013/0267616 A1 | 10/2013 | McKeown et al. |
| 2014/0251897 A1 | 9/2014 | Livingston et al. |
| 2014/0255636 A1 | 9/2014 | Odeh et al. |
| 2015/0148439 A1 | 5/2015 | Eddaoudi et al. |
| 2015/0165383 A1 | 6/2015 | Liskey et al. |
| 2015/0239806 A1 | 8/2015 | Wendland |

FOREIGN PATENT DOCUMENTS

| | | |
|---|---|---|
| WO | 2012035328 | 3/2012 |
| WO | 2014186108 | 11/2014 |
| WO | 2015018576 | 2/2015 |
| WO | 2015095026 | 6/2015 |
| WO | 2015095034 | 6/2015 |
| WO | 2015095044 | 6/2015 |
| WO | 2015129925 | 9/2015 |
| WO | 2016148869 | 9/2016 |
| WO | 2016161367 | 10/2016 |
| WO | 2016195977 | 12/2016 |
| WO | 2016206008 | 12/2016 |
| WO | 2017030450 | 2/2017 |
| WO | 2017091357 | 6/2017 |

OTHER PUBLICATIONS

Fritsch et al., Journal of Membrane Science 401-402 (2012) 222-231.

Xiaohua Ma et al., Synthesis and Gas Transport Properties of Hydroxyl-Functionalized Polyimides with Intrinsic Microporosity, Macromolecules, vol. 45, No. 9 (May 8, 2012).

Xiaohula Ma et al., Novel Spirobifluorene and Dibromospirobifluorene-based Polyimides of Intrinsic Microporosity for Gas Separation Applications, Macromolecules, vol. 46, No. 24, (Dec. 23, 2013).

Fu Yun Li et al., High-Performance Thermally Self-Cross-Linked Polymer of Intrinsic Microporosity (PIM-1) Membranes for Energy Development, Macromolecules, vol. 45, No. 3, (Feb. 14, 2012).

Reissed, Arnold et al.: Action of formaldehyde on formylated aromatic amines and on isatin, Chemical Abstracts Service Columbus, Ohio, US; (Dec. 16, 2001).

* cited by examiner

ISATIN COPOLYMERS HAVING INTRINSIC MICROPOROSITY

FIELD

The invention relates to microporous copolymers derived from monomers including a plurality of isatin moieties. The copolymers have particular utility as membranes useful in gas separation and nanofiltration.

INTRODUCTION

Polymers with intrinsic microporosity (PIMS) are characterized by having macromolecular structures that are both rigid and contorted so as to have extremely large fractional free volumes. Examples include poly(1-trimethylsilyl-1-propyne) (PTMSP), poly(4-methyl-2-pentyne) (PMP) and polybenzodioxane (PIM-1). Because of their exceptional free volume, all are extremely permeable. See: Baker, Membrane Technology and Applications, 3$^{rd}$ ed., (2012), and Polymers of Intrinsic Microporosity, Enc. Polymer Sci. & Tech., (2009)—both by John Wiley & Sons Ltd. See also: WO2005/113121; US2004/01985587; US2013/0146538; US2013/0172433; US2013/0267616; US2014/0251897; U.S. Pat. No. 9,018,270; U.S. Pat. No. 8,623,928; U.S. Pat. No. 8,575,414; U.S. Pat. No. 8,056,732; U.S. Pat. No. 7,943,543; U.S. Pat. No. 7,690,514 and U.S. Pat. No. 7,410,525 which are incorporated herein in their entirety. By way of example, US2014/0251897 describes a thin layer composite membrane including a thin selective layer of a networked microporous polymer having intrinsic microporosity formed via an interfacial polymerization of monomers having concavity (e.g. spirobisindanes, bisnapththalenes, ethanoanthracenes). U.S. Pat. No. 7,771,857 describes polymer electrolyte membranes polymerized from monomer units including aromatic polyarylenes groups with proton-conducting functional groups.

SUMMARY

The invention includes copolymers having intrinsic microporosity and membranes made therefrom. In one embodiment, the invention includes a copolymer including a repeating unit represented by Formula I:

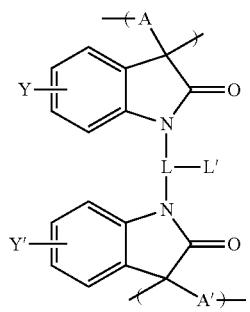

wherein: L is a divalent hydrocarbon group comprising from 1 to 12 carbon atoms; and L' is optional and when present is represented by:

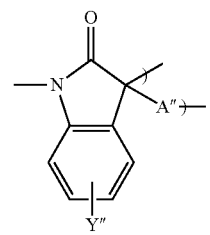

wherein: Y, Y' and Y" are independently selected from: a carboxylic acid, sulfonic acid, phosphorous acid and phosphoric acid and their corresponding salt or ester; imino, amide, nitrile, hydrogen, hydroxyl and alkyl comprising from 1 to 6 carbon atoms; and A, A' and A" are independently selected from an arylene moiety (preferably a polyarylene group), with the proviso one or both Y" and A" are optional and may not be present.

In one preferred embodiment, Y and Y'; and Y" when present, are hydrogen. In another preferred embodiment, Y and Y'; and Y" when present, are carboxylic acid (—COOH). In another preferred embodiment, L is selected from alkylene, alkenylene, arylene and aralkylene. In additional embodiments, the invention includes thin films, coatings and membrane made using the subject copolymers, including B-stage forms of the copolymers useful in the formation of such films, coatings and membranes.

DETAILED DESCRIPTION

In a preferred embodiment, the subject copolymers (also referred to herein as "polymers") are network polymers having intrisic microporosity. The term "network polymer" refers to a covalently crosslinked 3-dimension polymer network in contrast to a "non-network polymer" or linear polymer which does not having a covalently crosslinked 3-dimension network. The term "intrinsic microporosity" refers to a polymer having a continuous network of interconnected intermolecular voids which form a direct consequence of the shape and rigidity of at least a portion of the components monomers of the polymer. The term "microporous" refers to a material having an interconnected system of voids of a diameter less than 2 nm as defined by the IUPAC. The term "B-stage" is defined as "an intermediate stage in a thermosetting resin reaction in which the plastic softens but does not fuse when heated, and swells but does not dissolve in contact with certain liquids", see McGraw-Hill Dictionary of Scientific & Technical Terms, 6E, Copyright 2003 by The McGraw-Hill Companies, Inc.

Preferably, the subject copolymers have average pore diameters of from 0.2 to 20 nm as determined by standard bubble point test (e.g. ASTM F316-03 (2011)). The copolymers also have high apparent surface areas (e.g. greater than 100 m$^2$/g, and more preferably greater than 150 m$^2$/g as determined by the Brunauer-Emmett-Teller (BET) method.

The network nature of the copolymers of the present invention address one or more of the shortcomings associated with known PIMs technology, e.g. increased membrane durability, rejection, fouling resistance, rigidity and dimensional stability leading to better maintenance of nanoporous structure under varied end uses conditions, better tolerance toward functional groups needed to enhance selectivity, improved processability and fabrication, higher glass transition temperature, higher thermal stability, higher thermooxidative stability, increased moisture resistance, increased corrosion resistance to acids and bases, and organic solvent resistance.

Membranes made using the subject copolymers may be formed by conventional techniques, e.g. casting, in-situ polymerization upon a porous support, dip coating and subsequent polymerization onto a porous support, etc. Such membranes are useful in separations based upon the relative rates of mass transfer of different species across a membrane. A driving force, typically a pressure or a concentration difference, is applied across the membrane so that selected species preferentially pass across the membrane. The membranes may be used for purification, separation or adsorption of a particular species (e.g. salts, organics, ionic species) in the liquid (e.g. aqueous, organic) or gas phase. In particular, the subject membranes exhibit excellent pH and solvent stability and as a consequence, are suitable for use in a wide range of applications including: gas separation, ion exchange, water softening, water purification, ultra high purity water production in applications such as electronics, metal separation including rare earths, catalysis, remediation of mining waste water, uranium processing, leach mining, and processing of liquids in dairy, sugar, fruit juice and pharmaceuticals and ethanol production in a continuous fermentation/membrane pervaporation system. In specific embodiments, the subject copolymers include hydrophilic functional groups, e.g. carboxylic acid, that provide improved selectivity in many applications.

The subject membrane is not particularly limited to a specific type, construction or application. For example, the subject polymers may be fabricated into to flat sheet (film), tubular and hollow fiber configurations that find utility in a variety of applications including gas separations, pervaporation, forward osmosis (FO), reverse osmosis (RO), nano filtration (NF), ultra filtration (UF), micro filtration (MF) and pressure retarded fluid separations. One preferred design is a thin film composite structure. See for example WO 2005/113121 and US2014/0251897. With a thin film composite design a "thin film" of the subject polymer is formed upon a support using well known techniques, e.g. dip coating, casting, etc., a solution of the subject polymer and conducting a phase separation (e.g. via quench, cooling, etc.) to form the desired porosity. The resulting membrane may be further subject to heating to facilitate crosslinking By way of a more specific example, the composite membrane may include a bottom layer (back side) of a nonwoven backing web (e.g. PET scrim), a middle layer of a porous support having a typical thickness of about 25-125 μm and top layer (front side) comprising a thin film polymer layer having a thickness typically less than about 1 micron, e.g. from 0.01 micron to 1 micron but more commonly from about 0.01 to 0.1 μm. The porous support is typically a polymeric material having pore sizes which are of sufficient size to permit essentially unrestricted passage of permeate but not large enough so as to interfere with the bridging over of a thin film polymer layer formed thereon. For example, the pore size of the support preferably ranges from about 0.001 to 0.5 μm. Non-limiting examples of porous supports include those made of: polysulfone, polyether sulfone, polyimide, polyamide, polyetherimide, polyacrylonitrile, cross-linked polyacrylonitrile, poly(methyl methacrylate), polyethylene, polypropylene, and various halogenated polymers such as polyvinylidene fluoride. For most applications, the porous support provides strength but offers little resistance to fluid flow due to its relatively high porosity.

The invention includes copolymers having intrinsic microporosity and membranes made therefrom. In one embodiment, the invention includes a copolymer including a repeating unit represented by Formula I:

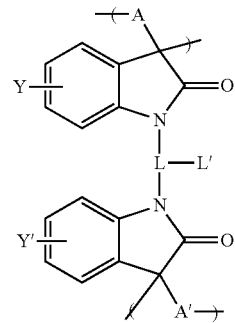

wherein: L is a divalent hydrocarbon group comprising from 1 to 12 carbon atoms; and L' is optional and when present is represented by:

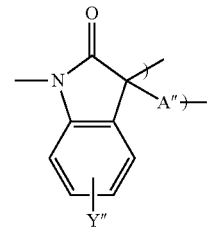

wherein: Y, Y' and Y" are independently selected from: a carboxylic acid, sulfonic acid, phosphorous acid and phosphoric acid and their corresponding salt or ester; imino, amide, nitrile, hydrogen, hydroxyl and alkyl comprising from 1 to 6 carbon atoms; and A, A' and A" are independently selected from an arylene moiety (preferably a polyarylene group, i.e. a group including a plurality of arylene moieties), with the proviso one or both Y" and A" are optional and may not be present.

In one preferred embodiment, Y and Y', and Y" when present, are hydrogen or carboxylic acid. In another preferred embodiment, L is selected from alkylene, alkenylene, arylene and aralkylene. In yet another embodiment, A, A', and A" when present, are independently selected from a polyarylene group represented by Formula III:

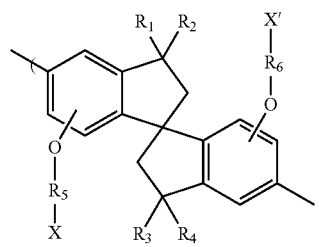

wherein: $R_1$, $R_2$, $R_3$, and $R_4$ are independently selected from: hydrogen, alkyl groups comprising from 1 to 6 carbon atoms, and $R_1$ and $R_2$ may collectively form a ketone group or a 9,9'-fluorene group, and $R_3$ and $R_4$ may collectively form a ketone group or a 9,9'-fluorene group;

$R_5$ and $R_6$ are independently selected from: a bond and an alkylene group comprising from 1 to 6 carbon atoms; and X and X' are independently selected from: a carboxylic acid, sulfonic acid and phosphoric acid and their corresponding salt or ester; imino, amide, nitrile, hydrogen, alkyl having from 1 to 6 carbon atoms and alkoxy having from 1 to 6 carbon atoms. In a more preferred embodiment, $R_1$, $R_2$, $R_3$, and $R_4$ are independently selected from hydrogen and alkyl groups comprising from 1 to 6 carbon atoms; and X and X' are independently selected from a carboxylic acid, sulfonic acid and phosphoric acid and their corresponding salt or ester, or when $R_5$ and $R_6$ are a bond, X and X' are hydrogen.

In another embodiment A and A'; and A" when present, are independently selected from a polyarylene group represented by Formula IV:

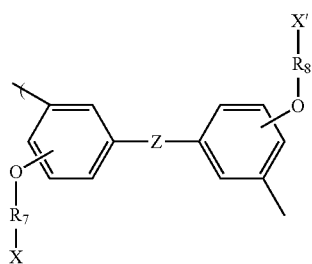

wherein:

$R_7$ and $R_8$ are independently selected from: a bond and an alkylene group comprising from 1 to 6 carbon atoms;

X and X' are independently selected from: a carboxylic acid, sulfonic acid and phosphoric acid and their corresponding salt or ester; imino, amide, nitrile, hydrogen, alkyl having from 1 to 6 carbon atoms and alkoxy having from 1 to 6 carbon atoms; and Z is a linking group selected from: a bond, a fused ring (e.g. 5 or 6 membered heterocyclic ring containing at least one of: O, S, N), and one or more of the following: substituted or unsubstituted arylene, ether, thioether, carbonate and sulfate. In a preferred embodiment, Z, $R_7$ and $R_8$ are bonds and X and X' are hydrogen.

The subject copolymers may include additional repeating units or branching, i.e. be formed via a copolymerization; however, the subject polymers preferably comprise at least 50 molar %, 75 molar % and more preferably at least 90 molar % of repeating units represented by Formula I (e.g. 50-100 molar %, 75-100 molar % and 90 to 100 molar % of the subject monomers).

The subject copolymer may be prepared using known starting materials and techniques. For example, bridged isatin monomers can be generally prepared by the methods described by David St.C. Black, Angus J. Hartshorn, Michael Homer, Siegfried Hünig, Aust. J. Chem., 30, 2493-2514 (1977); Larry E. Overman, Emily A. Peterson, Tetrahedron, 59, 6905-6919 (2003); David St.C. Black, Corrie H. Bos Vanderzalm, Angus J. Hartshorn, Aust. J. Chem., 30, 225-229 (1977); David St.C. Black, G. Ian Moss, Aust. J. Chem., 40, 129-142 (1987); Charles M. Clay, Hagar M. Abdallah, Carly Jordan, Kyle Knisley, Daniel M. Ketcha, volume 2012, issue 6, 317-325; Simon J. Garden, Jose C. Tones, Leonardo E. da Silva, Angelo C. Pinto, Synthetic Communications, 28(9), 1679-1689 (1998).

Similarly, spirobisindane monomers may be prepared using the methods described by Chen, W-F.; Lin, H-Y.; Dai, S. A.; Organic Letters, 6, 14, 2341-2343 (2004); Faler, G. R.; Lynch, J. C.; U.S. Pat. No. 4,701,566 (Oct. 20, 1987); Ito, M.; Iimuro, S.; U.S. Pat. No. 5,339,783 (Mar. 21, 1995); Curtis, R. F.; Lewis, K. O.; J. Chem. Soc., 418-421 (1962); Baker, W.; J. Chem. Soc., 1678-1681 (1934); Fisher, C. H.; Furlong, R. W.; Grant, M.; Journal of the American Chemical Society 58, 820-822 (1936); Baker, W.; Besly, D. M.; J. Chem. Soc., 1421-1424 (1939); Baker, W.; Besly, D. M.; J. Chem. Soc., 347-353 (1938), Ma, X; Swaidan, Y. B.; Zhu, Y.; Litwiller, E.; Jouiad, I. P.; Han, Y.; Macromolecules, 45, 3841-3849 (2012); Li, S.; Jo, H. J.; Han, S. H.; Park, C. H.; Kim, S ; Budd, P. M.; Lee, Y. M.; Journal of Membrane Science, 434, 137-147 (2013). A representative reaction pathway is provided below for preparation of a spirobisindane bis(carboxylic acid).

B-staging or prepolymerization can be accomplished by using lower temperatures and/or shorter curing times and/or reduced catalyst concentration, for example, with a solution of a bridged isatin monomer and a spirobisindane monomer. Curing of the thus formed B-staged (prepolymerized) copolymers can then be accomplished at a later time or immediately following B-staging (prepolymerization) by increasing the temperature and/or curing time.

Reaction pathway I:

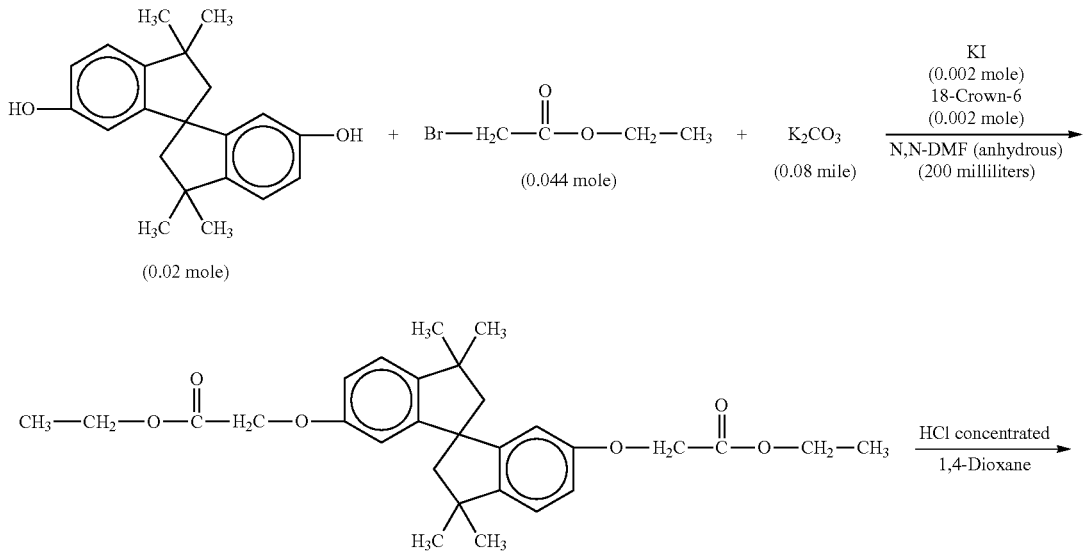

-continued

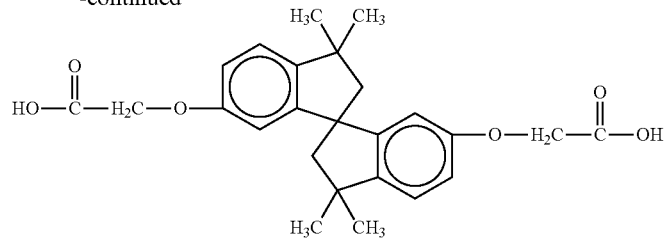

The many known methods of amide formation can adapted for crosslinking of the copolymers containing carboxylic acid groups. Formation of the amide typically requires activation of the carboxylic acid moiety with a coupling reagent. This activation converts the hydroxyl group of the carboxylic acid to a suitable leaving group, thus avoiding formation of a carboxylic acid salt with the amine reactant. The reaction of the activated intermediate with the amine is the coupling reaction and the activator used is the coupling reagent, see Han, S.-Y.; Kim, Y -A. Tetrahedron 60, 2447 (2004). Depending upon the specific chemistry used, the reactive acylating agent may be formed in a separate reaction and then reacted with the amine or it may be formed in situ by adding the activating agent to the mixture of carboxylic acid and amine reactants. Additives, such as N-hydroxysuccinimide and 1-hydroxybenzotriazole, that enhance the reactivity of the coupling reagent, may also be used. A specific example is an additive that forms an active ester with the carboxylic acid, such as an O-acylisourea or a benzotriazole active ester. Coupling reagents may be prepared by reaction of a carboxylic acid ester to a hydrazide which is then further reacted with nitrous acid or an alkyl nitrite to give the azide for reaction with the amine reactant. Diphenylphosphoryl azide can perform coupling in the presence of a base as a single high yield step, see Shioiri, T.; Ninomiya, K.; Yamada, S.; J. Am. Chem. Soc. 94, 6203 (1972). Reaction of a carboxylic acid phosphinothioester with an azide provides a iminophosphorane that rearranges to an amido phosphonium salt which hydrolyzes to the amide, see Nilsson, B. L.; Hondal, R. J.; Soellner, M. B.; Raines, R. T.; J. Am. Chem. Soc. 125, 5268 (2003). A mixed anhydride, for example, generated via reaction of pivaloyl chloride with the carboxylic acid group, is then reacted with the amine reactant to produce the amide. Ethyl chloroformate or isobutyl chloroformate are also used for synthesis of mixed carbonic anhydrides. A separate reaction of the carboxylic acid with the chloroformate is typically followed by reaction of the resultant mixed carbonic anhydride with the amine compound. Mixed ethyl carbonic anhydrides can be synthesized via reaction of a carboxylic acid with 1-ethoxycarbonyl-2-ethoxy-1,2-dihydroquinoline in the presence of the amino component as a single step direct coupling, see Belleau, B.; Malek, G.; J. Am. Chem. Soc. 90 (1968).

Carboxylic acids may be crosslinked by a primary amine compound in the presence of a carbodiimide compound to prepare an oligomer or polymer simultaneouslycontaining nanoporosity. In the reaction,one or more carboxylic acid groups are reacted with one or more primary amine containing compounds (monoamine, diamine, and/or polyamines may be used) and one or more carbodiimide crosslinking agents. For crosslinking in aqueous media, a water-soluble carbodiimide is employed, such as 1-ethyl-3-(-3-dimethylaminopropyl) carbodiimide hydrochloride. For crosslinking in non-aqueous media, an organic solvent soluble carbodiimide is employed, such as N',N'-dicyclohexyl carbodiimide. In the crosslinking chemistry, the carbodiimide reacts with carboxylic acid group to form an active O-acylisourea intermediate that is easily displaced by nucleophilic attack from a primary amino group in the reaction mixture. Reaction with the primary amine results in an amide bond formed with the original carboxyl group, with the carbodiimide by-product released as an urea derivative. 1-Ethyl-3-(-3-dimethylamino propyl) carbodiimide hydrochloride crosslinking is most efficient in acidic (pH 4.5) conditions and must be performed in buffers devoid of extraneous carboxyls and amines 4-Morpholinoethanesulfonic acid buffer is a suitable carbodiimide reaction buffer. Phosphate buffers and neutral pH (up to 7.2) conditions are compatible with the reaction chemistry, but with lower efficiency.

Representative reaction pathways for copolymerization are summarized below.

Reaction pathway II:

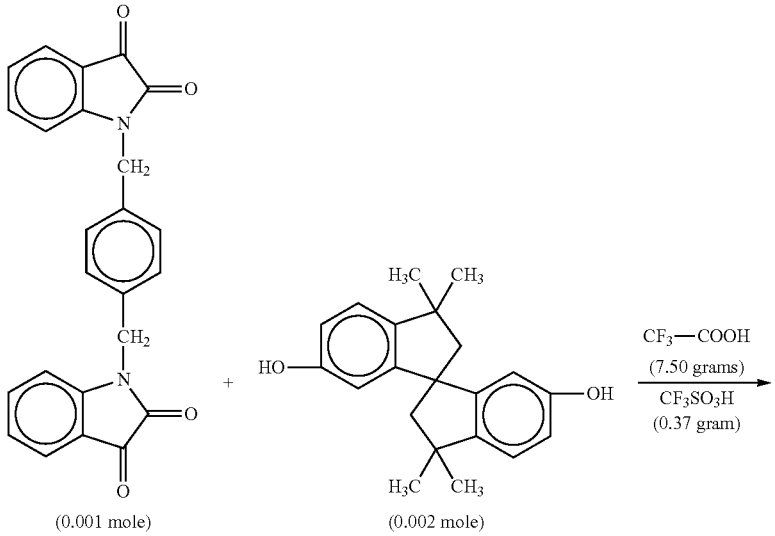

-continued
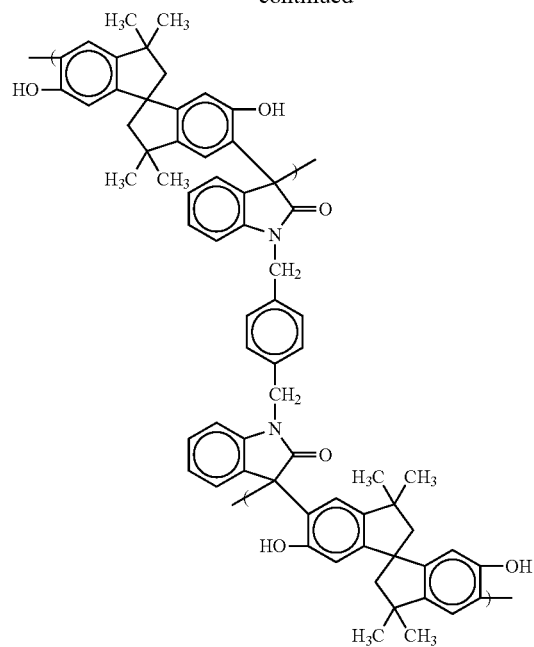
Reaction pathway III:
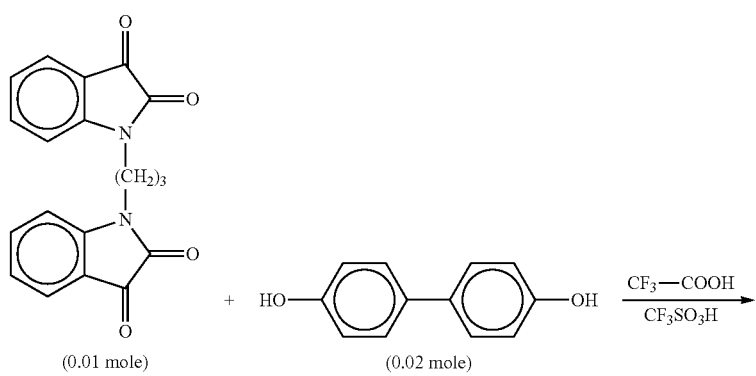
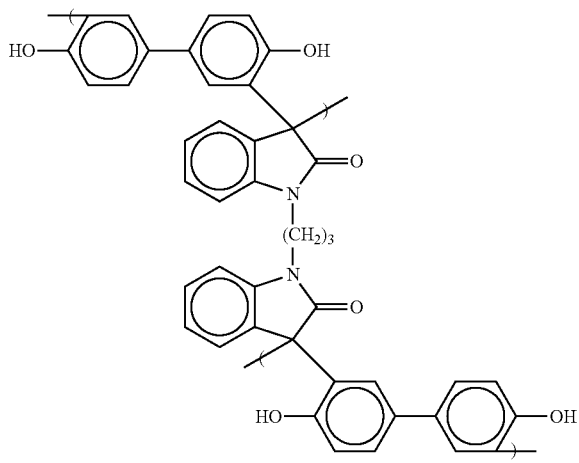

Reaction pathway IV:

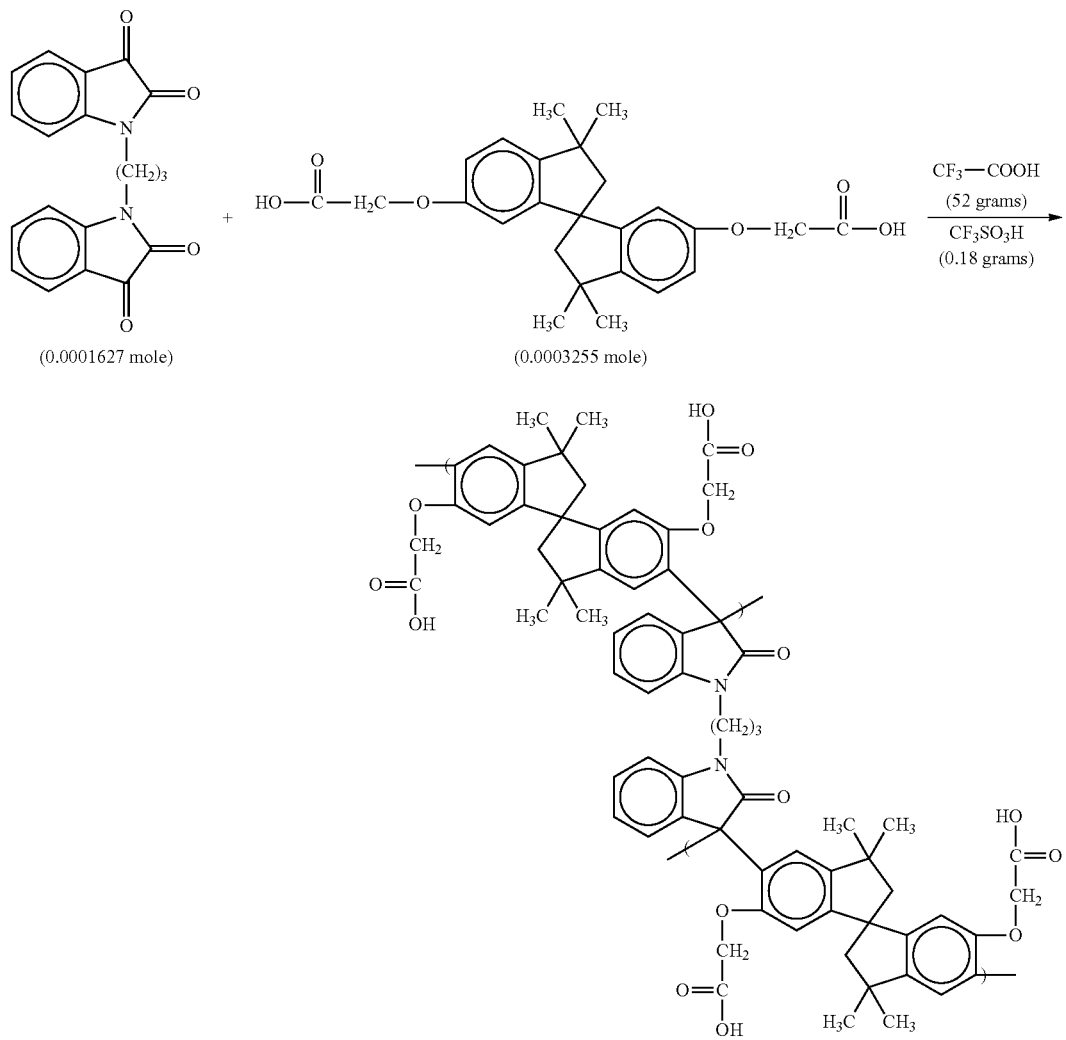

A number of variations are possible within the copolymer synthesis which are useful for modification of physical and mechanical properties. These variations include structural changes in the comonomers employed and changes in the stoichiometric ratio of comonomers employed. Examples of structural changes in the comonomers employed include: (a) variations of the bridging group between the isatin moieties, (b) addition of one or more substituents to the isatin aromatic ring and (c) variations of comonomer, for example, from a carboxymethyl ether of a spirobisindanediol to another suitable carboxy functional aromatic comonomer such as spirobisindanedicarboxylic acid. Changes in the stoichiometric ratio of comonomers employed include: (d) variations in equivalent ratio of comonomers used (can markedly change crosslink density), (e) inclusion of additional comonomers, for example, (1) partial substitution (substitution of 1% wt. up to 95% wt., more preferably from 1% wt to 50 wt) of the bridged isatin comonomer with isatin (as shown in Formula IV(a)), per se, and/or a compound containing a single isatin moiety, (can provide more thermoplastic region in the thermoset product) and, likewise (2) partial to total substitution of the bridged isatin comonomer with a (tris)isatin comonomer (can provide more crosslink density in the copolymer product), and (3) use of a blend of carboxylic acid functional aromatic monomer, such as carboxymethyl ether of a spirobisindanediol with a non-carboxylic acid functional aromatic monomer, such as a spirobisindanediol (can adjust the carboxylic acid equivalency in the copolymer product).

Formula IV(a)

wherein D is independently selected from the same groups defined for Y.

A specific example of (e)(2), a copolymer prepared using a tris(isatin) comonomer, is shown in Formula V.

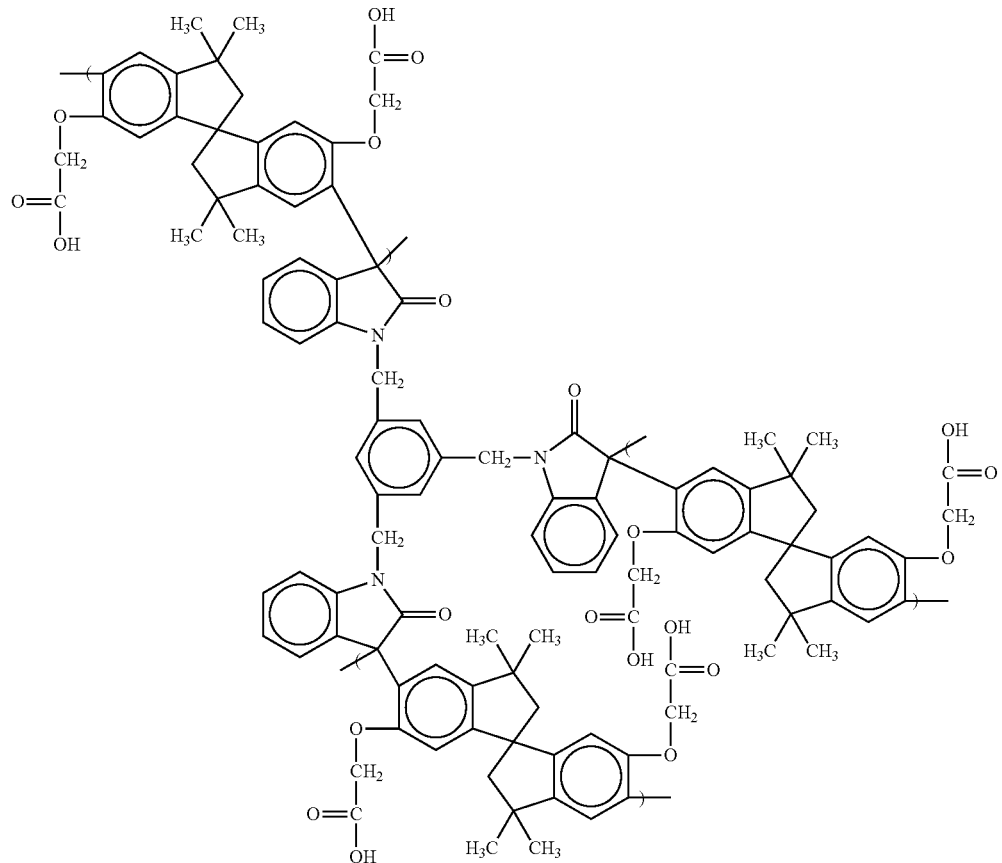
Formula V
A specific example of (e)(1), a copolymer prepared using partial substitution of the bridged isatin comonomer with an isatin, is shown in Formula VI. In this example, the carboxylic acid is solely provided by the N-carboxymethyl isatin structure.
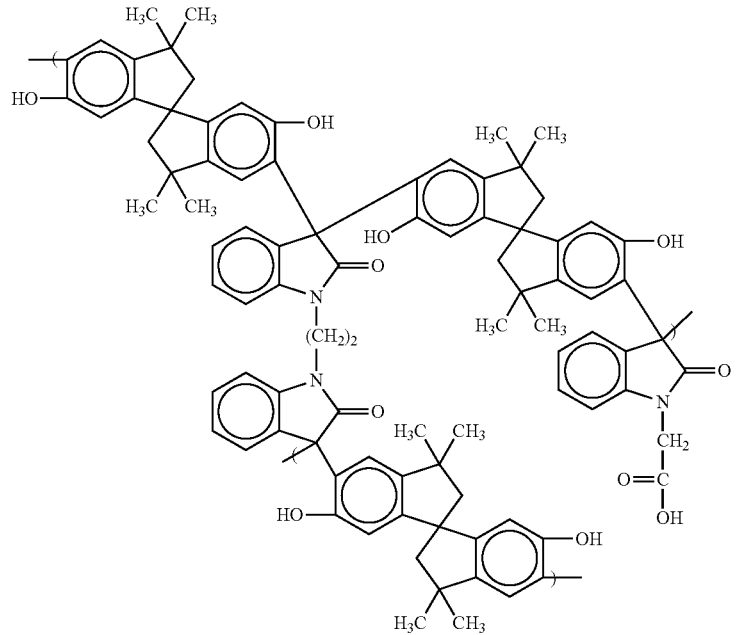
Formula VI Within the scope of the present invention are those copolymers containing O- and/or N-alkylsulfonic acid or sulfonate moieties, such as shown in Formula VII and VIII.

Formula VII

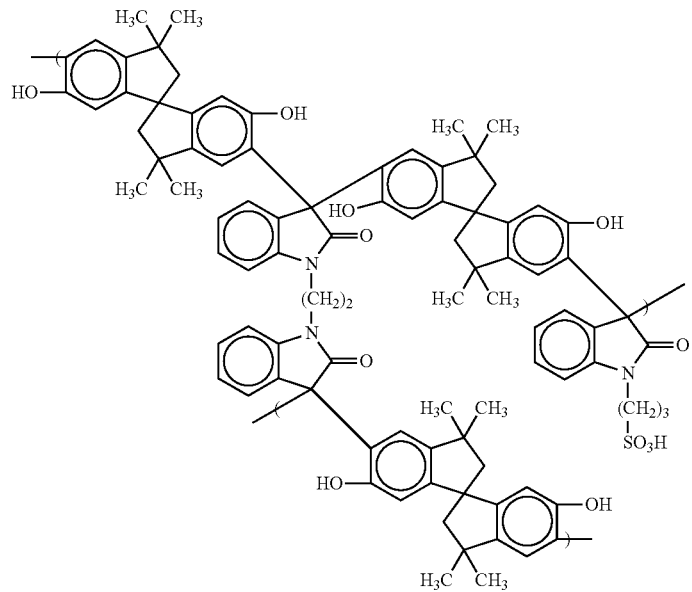

Formula VIII

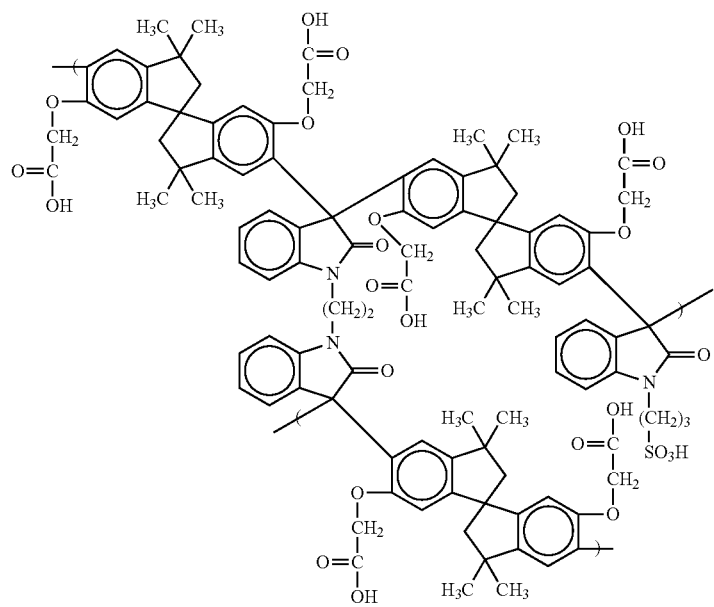

EXAMPLE 1

A. Synthesis of 1,1'-Propylbis(isatin) [1,1'-(Propane-1,3-diyl)bis(2,3-dihydroindole-2,3-dione)]: 1,3-Dibromopropane (99%, 5.05 grams, 0.025 mole, 0.050 Br equivalent) was added to a 2 ounce glass bottle then introduced into a dry nitrogen glove box (<0.2 ppm oxygen). Dimethylsulfoxide (anhydrous, 99.9+%, 33.3 milliliters) which had been sparged for 15 minutes with dry nitrogen then dried >24 hours over heat activated molecular sieves was added to the bottle and the contents mixed. In the dry nitrogen glove box, charge isatin (98%, 7.36 grams, 0.05 mole, 0.05 N—H equivalent, 100 area % by HPLC analysis) and 1,4-dioxane (anhydrous, 99.8%, 50 milliliters) which had been sparged for 15 minutes with dry nitrogen to a pre-dried (100° C., >24 hours) 500 milliliter glass 3 neck round bottom reactor equipped with an air cooled spiral overhead condenser, poly(tetrafluoroethylene) coated thermocouple in reactor, magnetic stirring, and a stoppered ground glass port. Magnetic stirring commenced to give an orange colored slurry at 26.6° C. After mixing for two minutes sodium hydride (dry, 95%, 1.28 grams) (1.01×100/95×0.05×24.00 grams/mole) was added in twenty-five approximately equal aliquots over 58 minutes with temperature increasing from 26.7° C. to 37.2° C. After addition of the third, fourth, seventeenth, nineteenth, twenty second and twenty fifth aliquots of sodium hydride, additional 1,4-dioxane was added: 16, 8, 8, 16, 8, and 24 milliliters, respectively, to wash product from the reactor walls and reduce viscosity. Four minutes later, a heating mantle was placed under the reactor, and heating of the 34.5° C. stirred slurry commenced. After 45 minutes the temperature equilibrated at 63.4° C., and an initial aliquot of 1,3-dibromopropane-dimethylsulfoxide solution was added by dropper into the dark purple colored stirred mixture. The temperature decreased to 60.7° C. The remaining 1,3-dibromopropane-dimethylsulfoxide solution was added in four approximately equal aliquots over 4 minutes with temperature ranging from 60.8 to 59.2° C. After two minutes, the temperature increased to 69.2° C. Heating commenced over the next 63 minutes to 100.0° C. then immediately ceased. The reactor was sealed and removed from the glove box into a vented hood. While hot the dark amber colored mixture was poured into in a 1 liter glass beaker containing magnetically stirred ethanol and deionized (DI) water 95/5 volume % (100 milliliters), then covered with aluminum foil, cooled to room temperature and placed into a refrigerator for the next 17.5 hours. The resultant crystalline slurry was gravity filtered on paper (Whatman 114V) and the crystalline product recovered on the filter paper dried in a vacuum oven for 22 hours at 50° C. A first crop of 6.18 grams of orange red colored powder was recovered. HPLC analysis of an aliquot of the dry product was completed demonstrating 99.22 area % 1,1'-propylbis(isatin). Product structure was confirmed via Fourier transform infrared (FTIR) spectrophotometric analysis of a KBr pellet of the product. The filtrate was added into a round bottom flask and rotary evaporated at 34° C. to remove most of the solvents. N,N-dimethylformamide/ethanol 50/50 volume % (40 milliliters) was added to the flask to facilitate removal of the product into a glass beaker as a slurry. A solution formed with magnetic stirring and heating to a boil on a hot plate. The solution in the beaker was held covered with aluminum foil until cooled to room temperature and then placed into the refrigerator. After 2 days in the refrigerator, gravity filtration on paper provided 0.38 gram of additional product after drying in the vacuum oven for 23 hours at 50° C. HPLC analysis of an aliquot of the dry product was completed demonstrating 96.11 area % 1,1'-propylbis(isatin).

B. Copolymerization of 1,1'-Propylbis(isatin) and 3,3,3',3'-Tetramethyl-1,1'-spirobisindane-6,6'-diol: 1:2 Mole Ratio Using Eaton's Reagent Catalyst: 1,1'-Propylbis(isatin) (97.60 area %, 0.334 gram, 0.001 mole) prepared using the method of A. above and 3,3,3',3'-tetramethyl-1,1'-spirobisindane-6,6'-diol (99.91 area %, 0.616 gram, 0.002 mole) were weighed into a 2 ounce glass bottle with poly(tetrafluoroethylene) lined lid using a scale with four place accuracy then introduced into the glove box. Once in the glove box, the bottle was opened to remove oxygen, as indicated by return of the reading on the glove box oxygen meter to <0.5 ppm. A magnetic stirring bar and trifluoroacetic acid (99%, 4.2 milliliters) were added to the bottle and stirring commenced to provide a solution. After stirring for two minutes, Eaton's reagent (3.1 milliliters) was added as a single aliquot using a disposable polypropylene dropper. The easily stirred solution immediately turned to a dark amber color, then one minute later co-polymerized to a dark solid. The sealed bottle containing the copolymer was removed from the glove box into a vented laboratory hood. DI water (40 milliliters) was added to the bottle followed by mixing and vacuum filtration of the copolymer slurry over a medium fitted glass funnel to give an orange colored powder on the filter and a light orange colored aqueous filtrate. The copolymer on the filter was washed with fresh DI water (10 milliliters). The damp copolymer was added to a 2 ounce bottle with a magnetic stirring bar and methanol (30 milliliters). After stirring for 23 hours, the slurry was filtered over paper (Whatman 114V) giving a red orange colored powder on the filter paper and a pale pink colored filtrate. A second extraction with methanol (30 milliliters) was repeated and after 21 hours, the slurry was filtered over paper giving a red orange colored powder on the filter paper and a very pale pink colored filtrate. The red orange colored powder on the filter paper was dried in the vacuum oven at 100° C. for 20 hours to give 0.89 gram. Full conversion of the reactants to copolymer was confirmed via FTIR spectrophotometric analysis of a KBr pellet. Nominal structure of the copolymer is given in Formula IX.

C. Characterization of Copolymer of 1,1'-Propylbis(isatin) and 3,3,3',3'-Tetramethyl-1,1'-spirobisindane-6,6'-diol: Differential scanning calorimetry (DSC) analysis of a portion (9.9 milligrams) of the copolymer of 1,1'-propylbis(isatin) and 3,3,3',3'-tetramethyl-1,1'-spirobisindane-6,6'-diol from B. above was completed using a rate of heating of 7° C. per minute from 0° C. to 350° C. under a stream of nitrogen flowing at 35 cubic centimeters per minute. No glass transition temperature or other events were detected. Thermogravimetric analysis (TGA) was conducted under 60 cc/m of nitrogen flow by heating a 5.541 milligram sample to 150° C. and holding for 60 minutes followed by cooling to 25° C. then heating to 500° C. at a rate of 10° C. per minute. A Td temperature of 383.6° C. was detected. Volatiles lost up to Td after prehold at 150° C. for 60 minutes under the dynamic nitrogen flow were 1.45 weight %. The copolymer was insoluble in boiling N,N-dimethylformamide.

Formula IX

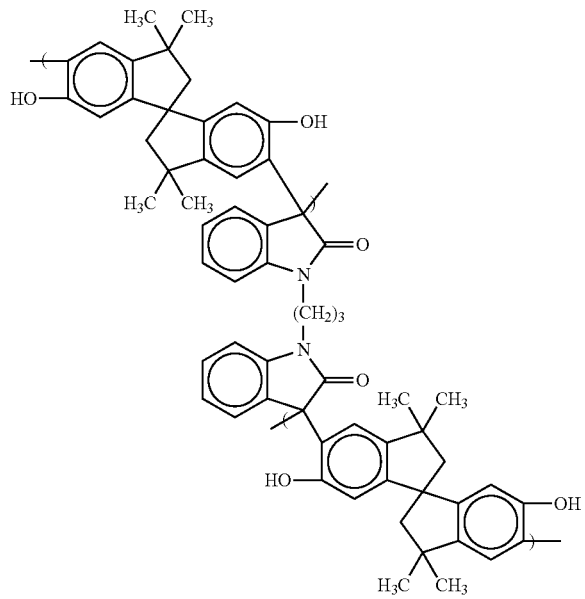

EXAMPLE 2

A. Synthesis of 1,1'-Xylylbis(isatin): α,α'-Dibromo-p-xylene (97%, 6.60 grams, 0.025 mole, 0.050 Br equivalent) was added to a 2 ounce glass bottle then introduced into a dry nitrogen glove box (<0.2 ppm oxygen). Dimethylsulfoxide (anhydrous, 99.9+%, 50.0 milliliters) which had been sparged for 15 minutes with dry nitrogen then dried >24 hours over heat activated molecular sieves was added to the bottle and the contents mixed with gentle heating to form a solution. In the dry nitrogen glove box, charge isatin (98%, 7.36 grams, 0.05 mole, 0.05 N—H equivalent, 100 area % by HPLC analysis) and 1,4-dioxane (anhydrous, 99.8%, 50 milliliters) which had been sparged for 15 minutes with dry nitrogen to a predried (100° C., >24 hours) 500 milliliter glass 3 neck round bottom reactor equipped with an air cooled spiral overhead condenser, poly(tetrafluoroethylene) coated thermocouple in reactor, magnetic stirring, and a stoppered ground glass port. Magnetic stirring commenced to give an orange colored slurry at 28.2° C. After mixing for one minute sodium hydride (dry, 95%, 1.28 grams) (1.01× 100/95×0.05×24.00 grams/mole) was added in twenty-six approximately equal aliquots over 60 minutes with temperature increasing from 28.2° C. to 37.6° C. After addition of the ninth, eleventh, twelfth, fourteenth, fifteenth, twenty second and twenty sixth aliquots of sodium hydride, additional 1,4-dioxane was added: 8, 8, 8, 16, 16, 16, and 16 milliliters, respectively, to wash product from the reactor walls and reduce viscosity. Four minutes later, a heating mantle was placed under the reactor, and heating of the 35.3° C. stirred slurry commenced. After 47 minutes the temperature equilibrated at 65.5° C., and an initial aliquot of α,α'-dibromo-p-xylene-dimethylsulfoxide solution was added by dropper into the dark purple colored stirred mixture. The temperature decreased to 64.5° C. The remaining α,α'-dibromo-p-xylene-dimethylsulfoxide solution was added in four approximately equal aliquots over 8 minutes with temperature ranging from 64.5 to 62.0° C. Heating of the brown colored slurry commenced over the next 41 minutes to 100.0° C. After the first 8 minutes of heating, magnetic stirring was impeded by the solids in the reactor. Addition of 1,4-dioxane (30 milliliters) restored mixing via magnetic stirring. After 28 minutes at 100° C., heating ceased and the reactor was sealed and removed from the glove box into a vented hood. While hot the dark amber colored mixture was poured into in a 1 liter glass beaker containing magnetically stirred ethanol and deionized (DI) water 95/5 volume % (100 milliliters), then covered with aluminum foil, cooled to room temperature and placed into a refrigerator for the next 16.9 hours. The resultant crystalline slurry was gravity filtered on paper and the crystalline product recovered on the filter paper dried in a vacuum oven for 24 hours at 100° C. The dry powder was added to 2 liters of 50/50 volume % N,N-DMF/ethanol and brought to a boil. Insoluble product was still present at boiling. While still boiling, the slurry was vacuum filtered through a medium fitted glass funnel. An amber orange filtrate and an orange colored powder on fritted funnel were recovered. The powder on the filter was dried 24 hours in a vacuum oven at 100° C. to provide 5.96 grams of product. HPLC analysis of an aliquot of the dry product was completed demonstrating 93.73 area % 1,1'-xylylbis(isatin). Product structure was confirmed via FTIR spectrophotometric analysis of a KBr pellet of the product. As the filtrate cooled to room temperature additional product came out of the solution. The filtrate slurry was added into a beaker and placed in the refrigerator. Two days later gravity filtration of the product on paper followed by drying for 20 hours at 100° C. in the vacuum oven gave 1.02 grams of orange colored product. HPLC analysis of an aliquot of the dry product was completed demonstrating 93.08 area % 1,1'-xylylbis(isatin).

B. Copolymerization of 1,1'-Xylylbis(isatin) and 3,3,3',3'-Tetramethyl-1,1'-spirobisindane-6,6'-diol: 1:2 Mole Ratio Using Trifluoromethanesulfonic Acid Catalyst: 1,1'-Xylylbis(isatin) (93.73 area %, 0.396 gram, 0.001 mole) from A. above and 3,3,3',3'-tetramethyl-1,1'-spirobisindane-6,6'-diol (99.91 area %, 0.616 gram, 0.002 mole) were weighed into a 2 ounce glass bottle with poly(tetrafluoroethylene) lined lid using a scale with four place accuracy then introduced into the glove box. Once in the glove box, the bottle was opened to remove oxygen, as indicated by return of the reading on the glove box oxygen meter to <0.5 ppm. A magnetic stirring bar and trifluoroacetic acid (99%, 7.5 grams) were added to the bottle and stirring commenced to provide a fine slurry. After stirring for twenty minutes, trifluoromethanesulfonic acid (0.16 gram) was added dropwise using a disposable polypropylene dropper. The easily stirred mixture immediately turned to a dark amber color with most solids now in solution. After stirring for 2 more minutes, additional trifluoromethanesulfonic acid (0.21 gram) was added dropwise giving an easily stirred dark amber colored solution which copolymerized to a dark solid one minute later. The sealed bottle containing the copolymer was removed from the glove box into a vented laboratory hood. DI water (50 milliliters) was added to the bottle followed by mixing and vacuum filtration of the copolymer slurry over a medium fritted glass funnel to give an orange amber colored powder on the filter and a colorless aqueous filtrate. The copolymer on the filter was washed with fresh DI water (30 milliliters). The damp copolymer was added to a 2 ounce bottle with a magnetic stirring bar and methanol (50 milliliters). After stirring for 72 hours, the slurry was filtered over paper giving a medium yellow colored powder on the filter paper and a light yellow colored filtrate. A second extraction with methanol (40 milliliters) was repeated and after 24 hours, the slurry was filtered over paper giving a medium yellow colored powder on the filter paper and a light yellow colored filtrate. A third extraction with methanol (40 milliliters) was repeated and after 24 hours, the slurry was filtered over paper again giving a medium yellow colored powder on the filter paper and a light yellow colored filtrate. The powder on the filter paper was dried in the vacuum oven at 100° C. for 20 hours to give 0.93 gram of medium yellow colored powder. Full conversion of the reactants to copolymer was confirmed via FTIR spectrophotometric analysis of a KBr pellet. Nominal structure of the copolymer is given in Formula X.

C. Characterization of Copolymer of 1,1'-Xylylbis(isatin) and 3,3,3',3'-Tetramethyl-1,1'-spirobisindane-6,6'-diol: DSC analysis of a portion (8.2 milligrams) of the copolymer of 1,1'-xylylbis(isatin) and 3,3,3',3'-tetramethyl-1,1'-spirobisindane-6,6'-diol from B. above was completed using a rate of heating of 7° C. per minute from 0° C. to 350° C. under a stream of nitrogen flowing at 35 cubic centimeters per minute. No glass transition temperature or other events were detected. TGA was conducted under 60 cubic centimeters per minute of nitrogen flow by heating a 8.372 milligram sample to 150° C. and holding for 60 minutes followed by cooling to 25° C. then heating to 500° C. at a rate of 10° C. per minute. A Td temperature of 380.9° C. was detected. Volatiles lost up to Td after prehold at 150° C. for 60 minutes under the dynamic nitrogen flow were 1.36 weight %. The copolymer was insoluble in boiling N,N-dimethylformamide.

Formula X

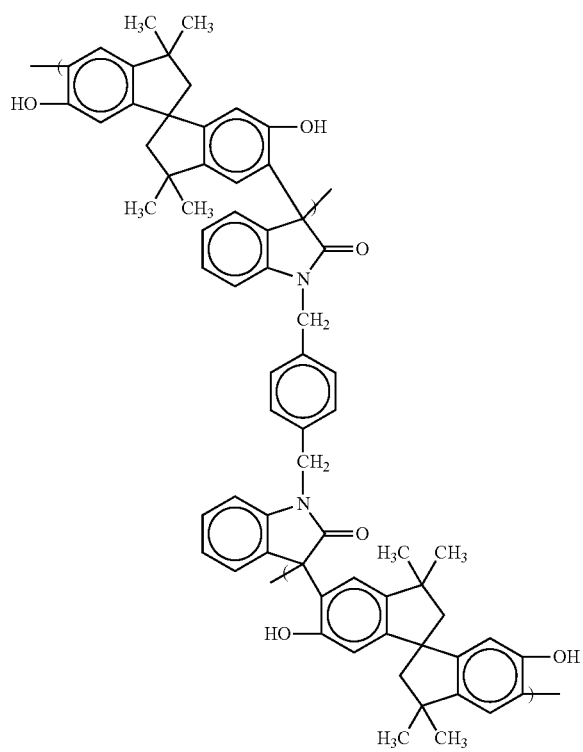

EXAMPLE 3

Thin Film Bonding of Copolymer of 1,1'-Propylbis(isatin) and 3,3,3',3'-Tetramethyl-1,1'-spirobisindane-6,6'-diol: 1:2 Mole Ratio Using Trifluoromethanesulfonic Acid Catalyst on a Polypropylene Support: 1,1'-Propylbis(isatin) (96.28 area %, 0.0334 gram, 0.00011157 mole) prepared using the method of EXAMPLE 1 A. and 3,3,3',3'-tetramethyl-1,1'-spirobisindane-6,6'-diol (99.91 area %, 0.0688 gram, 0.00022233 mole) were weighed into a glass vial with poly(tetrafluoroethylene) lined cap using a scale with four place accuracy then introduced into the glove box. Once in the glove box, the vial was opened to remove oxygen, as indicated by return of the reading on the glove box oxygen meter to <0.5 ppm. Trifluoroacetic acid (9.50 grams) was added to the vial using a disposable polypropylene dropper followed be sealing and shaking to mix and give a red orange colored solution of copolymerizable reactants. In the glove box trifluoroacetic acid (0.50 gram) was weighed into a second glass vial followed by weighing in trifluoromethane sulfonic acid (0.03 gram) both using clean disposable polypropylene droppers. The vial was then sealed with shaking to mix. The copolymerizable reactant solution and the catalyst solution were combined causing instantaneous change to a dark green colored solution. The vial was sealed followed by shaking to mix. Using a clean polypropylene dropper, the catalyzed copolymerization solution was applied to a clean 1 inch diameter polypropylene disk. After one hour in the glove box, the coated disk was removed and placed in the vacuum oven at room temperature and held overnight. The following day the coated disk was immersed into DI water. After 8 hours in the DI water bath, the coating appeared unchanged and would not release from the polypropylene disk. Attempts to get a sharp blade between a localized area of the film coating and polypropylene support would not debond the coating. Repeated back and forth bending of the disk to a 90 degree angle did finally release a localized area of the film as a narrow line at the bend area but any further release from this area could not be propagated by additional bending.

EXAMPLE 4

Thin Film Preparation from Copolymer of 1,1'-Xylylbis(isatin) and 3,3,3',3'-Tetramethyl-1,1'-spirobisindane-6,6'-diol: 1:2 Mole Ratio Using Trifluoromethanesulfonic Acid Catalyst:

A. 5 Minute B-Staging: 1,1'-Xylylbis(isatin) (93.73 area %, 0.1106 gram, 0.000279 mole) from EXAMPLE 2 A. and 3,3,3',3'-tetramethyl-1,1'-spirobisindane-6,6'-diol (99.91 area %, 0.1720 gram, 0.000558 mole) were weighed into a glass vial with poly(tetrafluoroethylene) lined cap using a scale with four place accuracy then introduced into the glove box. Once in the glove box, the vial was opened to remove oxygen, as indicated by return of the reading on the glove box oxygen meter to <0.5 ppm. Trifluoroacetic acid (23.54 grams) was added to the vial using a disposable polypropylene dropper followed be sealing and shaking to mix and give a red colored solution of copolymerizable reactants. In the glove box trifluoroacetic acid (6.00 grams) was weighed into a second glass vial followed by weighing in trifluoromethanesulfonic acid (0.20 gram) both using clean disposable polypropylene droppers. The vial was then sealed with shaking to mix. A portion of the copolymerizable reactant solution (0.60 gram) was weighed into a glass vial then a portion of the catalyst solution (0.20 gram) was weighed in causing instantaneous change to a light orange green colored solution. The vial was sealed followed by shaking to mix. After holding 5 minutes, the solution was dark green color and had increased in viscosity. For casting, a 75 x 38 mm glass microscopy slide which had been scored then broken in half was used. Using a clean polypropylene dropper, the B-staged solution was applied to the pair of glass plates (cleaned with methanol and dried in the oven before introduction into the glove box). After holding in the glove box for 20 minutes, the coated glass plates were removed from the glove box and immersed into DI water, immediately causing a very thin transparent film to float off of the slide and to the surface of the water. Film was recovered from the water bath by submerging a piece of polypropylene sheet under the floating film and slowly raising to deposit the film on the plastic surface. The wet film on the polypropylene surface was manipulated in the DI water bath so that an edge of the film protruded ⅟16 inch past the edge of the polypropylene sheet. The edge of film on the polypropylene sheet was then contacted with a paper towel and removed by applying light pressure on the film surface while simultaneously pulling the polypropylene sheet from under the film. The film was blotted with paper toweling to remove surface moisture. Films were removed from the drying material with tweezers and placed on a clean dry towel to further air dry. Examination of the film surface revealed it to be free of cracks or defects. When the film was bent in half, it returned back to flat orientation with no visually apparent damage.

B. 10 Minute B-Staging: The method of A. above was repeated except the B-staging time was increased from 5 minutes to 10 minutes. The dark green colored solution and had increased in viscosity after 10 minutes greater than that previously observed after 5 minutes. The films released from the glass surface were free of cracks or defects. When the film was bent in half, it returned back to flat orientation with no visually apparent damage but more slowly that previously observed for the film from the 5 minute B-staging. Using this method, a set of 31 films were prepared with each film being free of cracks or defects.

C. 40 Minute B-Staging: The method of A. above was repeated except the B-staging time was increased from 5 minutes to 40 minutes. The dark green colored solution progressively increased in viscosity. After 40 minutes, the first appearance of solids (gels) in the solution was noted.

EXAMPLE 5

Thin Film Preparation from Copolymer of 1,1'-Propylbis (isatin) and 3,3,3',3'-Tetramethyl-1,1'-spirobisindane-6,6'-diol: 1:2 Mole Ratio Using Trifluoromethanesulfonic Acid Catalyst:

A. 55 Minute B-Staging: A co-polymerizable reactant solution was prepared using the method of EXAMPLE 4 A. by weighing 1,1'-propylbis(isatin) (96.28 area %, 0.0933 gram, 0.00028 mole) and 3,3,3',3'-tetramethyl-1,1'-spirobis-indane-6,6'-diol (99.91 area %, 0.1722 gram, 0.00056 mole) into a glass bottle with poly(tetrafluoroethylene) lined cap using a scale with four place accuracy. The sealed bottle was then introduced into the glove box. Once in the glove box, the bottle was opened to remove oxygen, as indicated by return of the reading on the glove box oxygen meter to <0.5 ppm. Trifluoroacetic acid (47.08 grams) was added to the bottle using a disposable polypropylene dropper followed be sealing and shaking to mix and give a red colored solution of copolymerizable reactants. In the glove box, a catalyst solution was prepared by weighing trifluoroacetic acid (6.00 grams) into a glass vial followed by weighing in trifluoromethanesulfonic acid (0.20 gram), both using clean disposable polypropylene droppers. The vial was then sealed with shaking to mix. In the glove box, thirteen glass vials were each filled with co-polymerizable reactant solution (0.60 gram) followed by addition of catalyst solution (0.20 gram) and shaken to mix. The solutions slowly turned from red orange color to dark green color after addition of the catalyst. The solutions were B-staged by holding for 55 minutes with no indication of any solids (gel) formation. The catalyzed co-polymerizable solutions were used to cast a films on glass plates using the method given in EXAMPLE 4 A. The films on the glass plates were removed from the glove box 35 minutes after casting then immersed into the DI water bath. All 13 films easily separated from their glass plate after immersion in the water bath. After depositing on polypropylene sheets, 11 films were successfully removed without tearing. After air drying on clean toweling, 10 films were recovered free of cracks or defects.

B. 120 Minute B-Staging: The method of A. above was repeated except the B-staging time was increased from 55 minutes to 120 minutes. Using this method, a set of 10 films were prepared with each film being free of cracks or defects after recovery from air drying on clean toweling.

EXAMPLE 6

A. Synthesis of 1,1'-Ethylbis(isatin) [1,1'-(Ethane-1,3-diyl)bis(2,3-dihydroindole-2,3-dione)]: 1,3-Dibromoethane (98%, 4.70 grams, 0.025 mole, 0.050 Br equivalent) was added to a 2 ounce glass bottle then introduced into a dry nitrogen glove box (<0.2 ppm oxygen). Dimethylsulfoxide (anhydrous, 99.9+%, 33.3 milliliters) which had been sparged for 15 minutes with dry nitrogen then dried >24 hours over heat activated molecular sieves was added to the bottle and the contents mixed. In the dry nitrogen glove box, charge isatin (98%, 7.36 grams, 0.05 mole, 0.05 N—H equivalent, 100 area % by HPLC analysis) and 1,4-dioxane (anhydrous, 99.8%, 50 milliliters) which had been sparged for 15 minutes with dry nitrogen to a pre-dried (100° C., >24 hours) 500 milliliter glass 3 neck round bottom reactor equipped with an air cooled spiral overhead condenser, poly(tetrafluoroethylene) coated thermocouple in reactor, magnetic stirring, and a stoppered ground glass port. Magnetic stirring commenced to give an orange colored slurry at 24.8° C. After mixing for two minutes sodium hydride (dry, 95%, 1.28 grams) (1.01×100/95×0.05×24.00 grams/mole) was added in twenty-three approximately equal aliquots over 58 minutes with temperature increasing from 24.5° C. to 37.3° C. After addition of the fifteenth, nineteenth, and twenty third aliquots of sodium hydride, additional 1,4-dioxane (24 milliliters) was added to wash product from the reactor walls and reduce viscosity. Four minutes later, a heating mantle was placed under the reactor, and heating of the 33.9° C. stirred slurry commenced. After 45 minutes the temperature equilibrated at 61.0° C., and an initial aliquot of 1,3-dibromoethane-dimethylsulfoxide solution was added by dropper into the dark purple colored stirred mixture. The temperature decreased to 60.7° C. The remaining 1,3-dibromoethane-dimethylsulfoxide solution was added in five approximately equal aliquots over 6 minutes with temperature ranging from 60.6 to 59.5° C. Heating commenced over the next 62 minutes to 100.0° C. then immediately ceased. The reactor was sealed and removed from the glove box into a vented hood. While hot the dark red amber colored mixture was poured into in a 1 liter glass beaker containing magnetically stirred ethanol and deionized (DI) water 95/5 volume % (100 milliliters), then covered with aluminum foil, cooled to room temperature and placed into a refrigerator for the next 17 hours. The resultant crystalline slurry was gravity filtered on paper (Whatman 114V) and the crystalline product recovered and dried in a vacuum oven for 22 hours at 100° C. A first crop of 3.43 grams of brown red colored powder was recovered. HPLC analysis of an aliquot of the dry product was completed demonstrating 92.79 area % 1,1'-ethylbis(isatin). Product structure was confirmed via Fourier transform infrared (FTIR) spectrophotometric analysis of a KBr pellet of the product. The filtrate was added into a round bottom flask and rotary evaporated at 50° C. to remove most of the solvents. N,N-dimethylformamide/ethanol 50/50 volume % (40 milliliters) was added to the flask to facilitate removal of the product into a glass beaker as a slurry. A solution formed with magnetic stirring and heating to a boil on a hot plate. The solution in the beaker was held covered with aluminum foil until cooled to room temperature and then placed into the freezer. After 2 days in the freezer, gravity filtration on paper provided 4.47 grams of additional red orange colored crystalline product after drying in the vacuum oven for 20 hours at 100° C. HPLC analysis of an aliquot of the dry product was completed demonstrating 97.31 area % 1,1'-ethylbis(isatin). The filtrate was placed in the refrigerator and after gravity filtration on paper provided 1.06 grams of additional red orange colored powder after air drying. HPLC analysis of an aliquot of the slightly damp product was completed demonstrating 100 area % 1,1'-ethylbis(isatin).

B. Copolymerization of 1,1'-Ethylbis(isatin) and 3,3,3',3'-Tetramethyl-1,1'-spirobisindane-6,6'-diol: 1:2 Mole Ratio Using Trifluoromethanesulfonic Acid Catalyst: 1,1'-Ethylbis (isatin) (100 area %, 0.641 gram, 0.002 mole) from A. above and 3,3,3',3'-tetramethyl-1,1'-spirobisindane-6,6'-diol (99.91 area %, 1.233 grams, 0.004 mole) dissolved in trifluoroacetic acid (99%, 15.0 grams) were copolymerized via addition of trifluoromethanesulfonic acid (0.62 gram) using the method of EXAMPLE 2 B. After work-up using the method of EXAMPLE 2 B. 1.75 grams of orange colored powder was recovered. Full conversion of the reactants to copolymer was confirmed via FTIR spectrophotometric analysis of a KBr pellet. Nominal structure of the copolymer is given in Formula XI.

C. Characterization of Copolymer of 1,1'-Ethylbis(isatin) and 3,3,3',3'-Tetramethyl-1,1'-spirobisindane-6,6'-diol: DSC analysis of a portion (10.9 milligrams) of the copolymer of 1,1'-ethylbis(isatin) and 3,3,3',3'-tetramethyl-1,1'-spirobisindane-6,6'-diol from B. above was completed using a rate of heating of 7° C. per minute from 0° C. to 350° C. under a stream of nitrogen flowing at 35 cubic centimeters per minute. No glass transition temperature or other events were detected. TGA was conducted under 60 cc/m of nitrogen flow by heating a 5.542 milligram sample to 150° C. and holding for 60 minutes followed by cooling to 25° C. then heating to 500° C. at a rate of 10° C. per minute. A Td temperature of 371.9° C. was detected. Volatiles lost up to Td after prehold at 150° C. for 60 minutes under the dynamic nitrogen flow were 3.66 weight %. The copolymer was insoluble in boiling N,N-dimethylformamide Formula XI

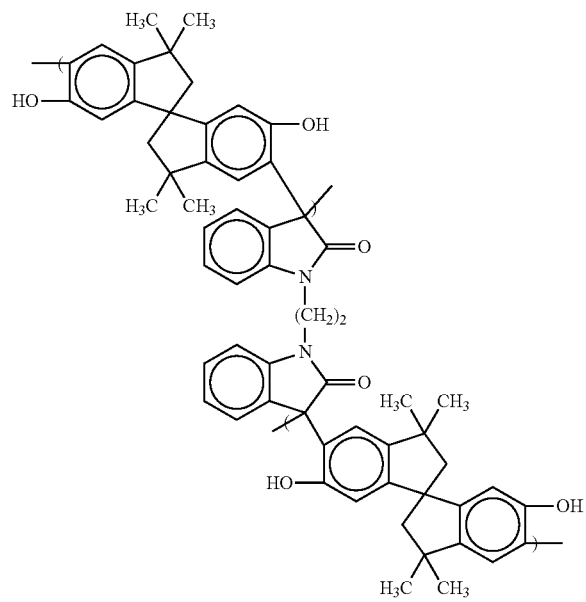

EXAMPLE 7

Thin Film Preparation from Copolymer of 1,1'-Ethylbis (isatin) and 3,3,3',3'-Tetramethyl-1,1'-spirobisindane-6,6'-diol: 1:2 Mole Ratio Using Trifluoromethanesulfonic Acid Catalyst:

A co-polymerizable reactant solution was prepared using the method of EXAMPLE 4 A. by forming a solution of 1,1'-ethylbis(isatin) (100 area %, 0.0894 gram, 0.00028 mole) and 3,3,3',3'-tetramethyl-1,1'-spirobisindane-6,6'-diol (99.91 area %, 0.1720 gram, 0.00056 mole) in trifluoroacetic acid (23.54 grams). A catalyst solution was prepared by weighing trifluoroacetic acid (9.00 grams) into a glass vial followed by weighing in trifluoromethanesulfonic acid (0.30 gram). In the glove box, ten glass vials were each filled with co-polymerizable reactant solution (0.60 gram). Catalyst solution (0.20 gram) was added to a single vial then the resultant catalyzed co-polymerizable solution was used to cast a film on a glass plate using the method given in EXAMPLE 4 A. The films on the glass plates were removed from the glove box 108 minutes after casting then immersed into a DI water bath. All 10 films easily separated from their glass plate after immersion in the water bath. After depositing on polypropylene sheets, all 10 films were successfully removed without tearing. After air drying on clean toweling, the 10 films were recovered free of cracks or defects.

EXAMPLE 8

Evaluation of B-Staging in Preparation of Free-Standing Films Using 25% Carboxylic Acid Functional Comonomer: A copolymerizable reactant solution was prepared by weighing 1,1'-propylbis(isatin) (96.28 area %, 0.0466 gram, 0.0001395 mole), 3,3,3',3'-tetramethyl-1,1'-spirobisindane-6,6'-carboxymethyl ether (96.95 area %, 0.0296 gram, 0.00006977 mole, see Reaction pathway I), and 3,3,3',3'-tetramethyl-1,1'-spirobisindane-6,6'-diol (99.91 area %, 0.0645 gram, 0.0002093 mole) into a glass vial with poly (tetrafluoroethylene) lined cap using a scale with four place accuracy. The sealed vial was then introduced into the glove box. Once in the glove box, the vial was opened to remove oxygen, as indicated by return of the reading on the glove box oxygen meter to <0.5 ppm. Trifluoroacetic acid (11.77 grams) was added to the vial using a disposable polypropylene dropper followed be sealing and shaking to mix and give a solution of copolymerizable reactants. In the glove box trifluoroacetic acid (6.07 grams) was weighed into a second glass vial followed by weighing in trifluoromethanesulfonic acid (0.30 gram) both using clean disposable polypropylene droppers. The vial of catalyst solution was then sealed with shaking to mix. Five vials were prepared by weighing a portion of the copolymerizable reactant solution (0.60 gram) then a portion of the catalyst solution (0.20 gram) into individual glass vials. The vials were sealed followed by shaking to mix. For casting of a film, a 75 x 38 mm glass microscopy slide which had been scored then broken in half was used. Using a clean polypropylene dropper, the B-staged solution was applied to the pair of glass plates (cleaned with methanol and dried in the oven before introduction into the glove box). After holding in the glove box for 30 minutes, the coated glass plates were removed from the glove box and immersed into DI water, immediately causing a very thin transparent film to float off of the slide and to the surface of the water. Film was recovered from the water bath by submerging a piece of polypropylene sheet under the floating film and slowly raising to deposit the film on the plastic surface. The wet film on the polypropylene surface was manipulated in the DI water bath so that an edge of the film protruded 1/16 inch past the edge of the polypropylene sheet. The edge of film on the polypropylene sheet was then contacted with a paper towel and removed by applying light pressure on the film surface while simultaneously pulling the polypropylene sheet from under the film. The film was blotted with paper toweling to remove surface moisture. Films were removed from the drying material with tweezers and placed on a clean dry towel to further air dry. A film was cast on a glass plate using one vial of the catalyzed copolymerizable reactant solution immediately after preparation and thus had no B-staging time. The film readily released from the glass plate after submerging in the DI water bath but it became brittle and cracked after air drying for 30 minutes. Additional films were cast on a glass plates after 30, 60, 90, and 120 minutes of B-staging time of the respective vial of the catalyzed copolymerizable reactant solution. In each case, the film released readily from the glass plate after submerging in the DI water bath and was free of cracks or defects.

EXAMPLE 9

Preparation of a Free-Standing Film Using Isatin and 1,1'-Propylbis(isatin) with Carboxylic Acid Functional Comonomer: A copolymerizable reactant solution was prepared by weighing isatin (2,3-dioxo-2,3-dihydroindole) (0.0103 gram, 0.00007 mole); 1,1'-propylbis(isatin) (96.28 area %, 0.0233 gram, 0.00007 mole); 3,3,3',3'-tetramethyl-1,1'-spirobisindane-6,6'-carboxymethyl ether (96.95 area %, 0.0592 gram, 0.0001395 mole); and 3,3,3',3'-tetramethyl-1,1'-spirobisindane-6,6'-diol (99.91 area %, 0.0430 gram, 0.0001395 mole) into a glass vial with poly(tetrafluoroethylene) lined cap using a scale with four place accuracy. The sealed vial was then introduced into the glove box. Once in the glove box, the vial was opened to remove oxygen, as indicated by return of the reading on the glove box oxygen meter to <0.5 ppm. Trifluoroacetic acid (11.77 grams) was added to the vial using a disposable polypropylene dropper followed be sealing and shaking to mix and give a solution of copolymerizable reactants. In the glove box trifluoroacetic acid (9.00 grams) was weighed into a second glass vial followed by weighing in trifluoromethanesulfonic acid (0.60 gram) both using clean disposable polypropylene droppers. The vial of catalyst solution was then sealed with shaking to mix. A portion of copolymerizable reactant solution (1.10 grams) and a portion of the catalyst solution (0.40 gram) were weighed into a glass vial. The vial was sealed followed by shaking to mix. A film was cast on a glass plate using the method of Example 8. After holding for 30 minutes, the film readily released from the glass plate after submerging in the DI water bath. The film cracked during repositioning on the polypropylene sheet for removal from the DI water bath. A thickness of 2 μ was measured via optical microscopy at 64 X viewing an edge of the film.

EXAMPLE 10

Copolymerization of 1,1'-Propylbis(isatin) and 3,3,3',3'-Tetramethyl-1,1'-spirobisindane- 6,6'-carboxymethyl ether: 1:2 Mole Ratio Using Trifluoromethanesulfonic Acid Catalyst: 1,1'-Propylbis(isatin) (97.60 area %, 0.0544 gram, 0.000163 mole) and 3,3,3',3'-tetramethyl-1,1'-spirobisindane-6,6'-carboxymethyl ether (96.95 area %, 0.1381 gram, 0.000326 mole) were weighed into a 2 ounce glass bottle with poly(tetrafluoroethylene) lined lid using a scale with four place accuracy then introduced into the glove box. Once in the glove box, the bottle was opened to remove oxygen, as indicated by return of the reading on the glove box oxygen meter to <0.5 ppm. A magnetic stirring bar and trifluoroacetic acid (99%, 5.2 grams) were added to the bottle and stirring commenced to provide a solution. After stirring for 41 minutes, trifluoromethanesulfonic acid (0.18 gram) was added dropwise using a disposable polypropylene dropper. The stirred solution immediately turned dark amber color. After stirring for 30 the sealed bottle containing the dark amber colored solution was removed from the glove box into a vented laboratory hood. DI water (15 milliliters) was added to the bottle followed by mixing and vacuum filtration of the copolymer slurry over a medium fitted glass funnel to give a medium yellow colored powder on the filter and a yellow colored aqueous filtrate. The copolymer on the filter was washed with fresh DI water (20 milliliters), giving a colorless filtrate. The powder on the filter paper was dried in the vacuum oven at 75° C. for 27 hours to give 0.19 gram of light yellow colored powder. Full conversion of the reactants to copolymer and the presence of -COOH groups were confirmed via FTIR spectrophotometric analysis of a KBr pellet. Nominal structure of the copolymer is given in Reaction pathway IV.

DSC analysis of a portion (7 9 milligrams) of the copolymer was completed using a rate of heating of 7° C. per minute from 0° C. to 350° C. under a stream of nitrogen flowing at 35 cubic centimeters per minute. No glass transition temperature or other events were detected. TGA was conducted under 60 cubic centimeters per minute of nitrogen flow by heating a 5.0190 milligram sample to 150° C. and holding for 60 minutes followed by cooling to 25° C. then heating to 500° C. at a rate of 10° C. per minute. A Td temperature of 295.6° C. was detected. Volatiles lost up to Td after prehold at 150° C. for 60 minutes under the dynamic nitrogen flow were 2.96 weight %. The copolymer was insoluble in boiling N,N-dimethylformamide

The invention claimed is:
1. A copolymer comprising a repeating unit represented by:

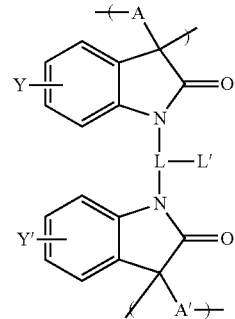

wherein: L is a divalent hydrocarbon group comprising from 1 to 12 carbon atoms; and L' is optional and when present is represented by:

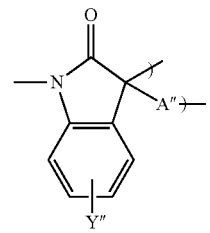

wherein: Y, Y' and Y" are independently selected from: a carboxylic acid, sulfonic, phosphorous acid and phosphoric acid and their corresponding salt or ester; imino, amide, nitrile, hydrogen, hydroxyl and alkyl comprising from 1 to 6 carbon atoms; and A, A' and A" are independently selected from an arylene moiety, with the proviso one or both Y" and A" are optional and may not be present.

2. The copolymer of claim 1 wherein Y and Y', and Y" when present, are hydrogen.

3. The copolymer of claim 1 wherein L is selected from alkylene, alkenylene, arylene and aralkylene.

4. The copolymer of claim 1 wherein A, A', and A" when present, are independently selected from a polyarylene group represented by:

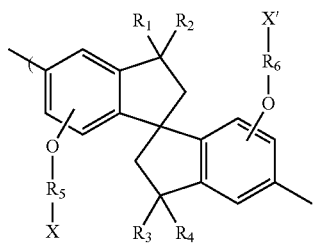

wherein: $R_1$, $R_2$, $R_3$, and $R_4$ are independently selected from: hydrogen, alkyl groups comprising from 1 to 6 carbon atoms, and $R_1$ and $R_2$ may collectively form a ketone group or a 9,9'-fluorene group, and $R_3$ and $R_4$ may collectively form a ketone group or a 9,9'-fluorene group;

$R_5$ and $R_6$ are independently selected from: a bond and an alkylene group comprising from 1 to 6 carbon atoms; and X and X' are independently selected from: a carboxylic acid, sulfonic acid and phosphoric acid and their corresponding salt or ester; imino, amide, nitrile, hydrogen, alkyl having from 1 to 6 carbon atoms and alkoxy having from 1 to 6 carbon atoms.

5. The copolymer of claim 4 wherein $R_1$, $R_2$, $R_3$, and $R_4$ are independently selected from hydrogen and alkyl groups comprising from 1 to 6 carbon atoms; and X and X' are independently selected from a carboxylic acid, sulfonic acid and phosphoric acid and their corresponding salt or ester; or when $R_5$ and $R_6$ are a bond, X and X' are hydrogen.

6. The copolymer of claim 1 wherein A and A'; and A" when present, are independently selected from a polyarylene group represented by:

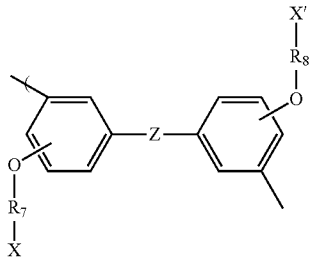

wherein: $R_7$ and $R_8$ are independently selected from: a bond and an alkylene group comprising from 1 to 6 carbon atoms;

X and X' are independently selected from: a carboxylic acid, sulfonic acid and phosphoric acid and their corresponding salt or ester; imino, amide, nitrile, hydrogen, alkyl having from 1 to 6 carbon atoms and alkoxy having from 1 to 6 carbon atoms; and Z is a linking group selected from: a bond, a fused ring, and one or more of the following: substituted or unsubstituted arylene, ether, thioether, carbonate and sulfate.

7. The copolymer of claim 6 wherein Z, $R_7$ and $R_8$ are bonds and X and X' are hydrogen.

8. The copolymer of claim 1 characterized by having an average pore size of from 0.2 to 20 nm as determined by ASTM F316-03 (2011).

9. The copolymer of claim 1 characterized by having an apparent surface area of greater than 100 $m^2/g$ as measured by the Brunauer-Emmett-Teller (BET) method.

10. A membrane comprising the copolymer of claim 1.

* * * * *